E. E. COLE.
PNEUMATIC TIRE.
APPLICATION FILED MAY 25, 1914.
1,239,886.
Patented Sept. 11, 1917.
2 SHEETS—SHEET 1.
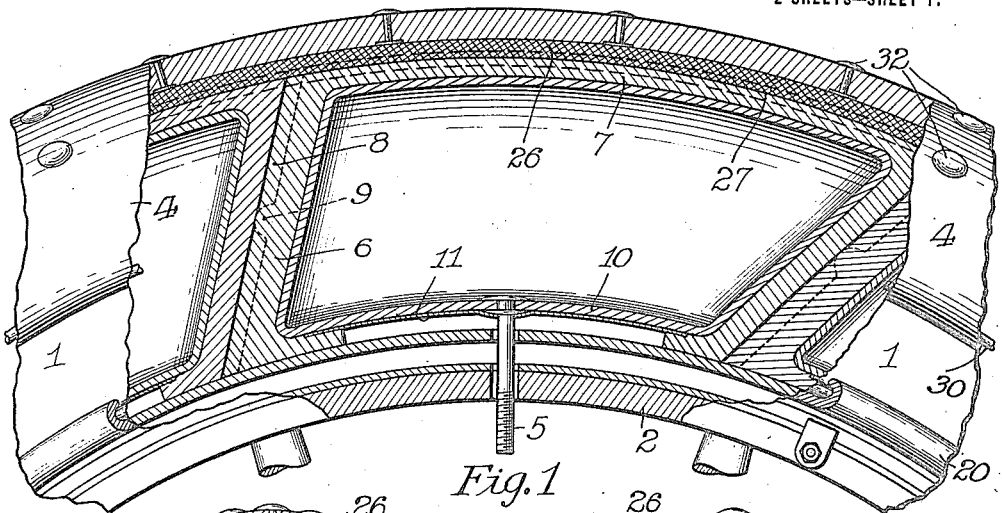
Fig. 1
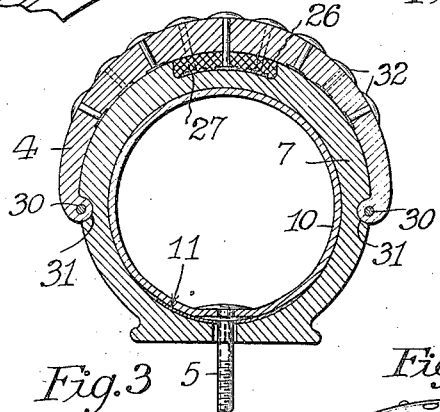
Fig. 3
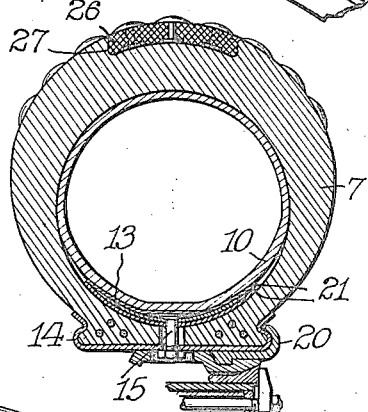
Fig. 2
Fig. 4
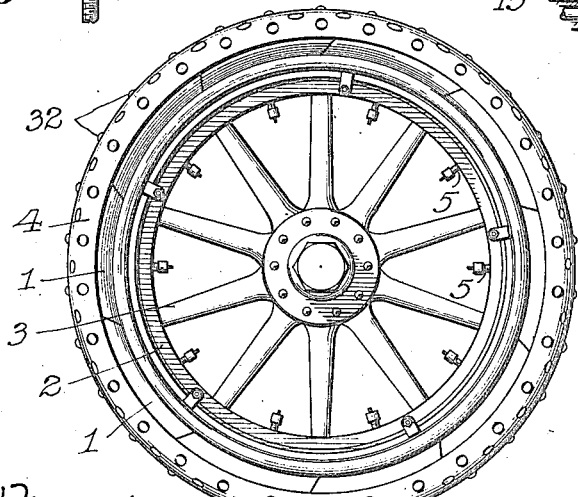
Witnesses:
Leonard W. Novander.
John H. Tienne
Inventor
Ernest E. Cole
By Brown, Hanson & Boettcher
Att'ys

E. E. COLE.
PNEUMATIC TIRE.
APPLICATION FILED MAY 25, 1914.

1,239,886.

Patented Sept. 11, 1917.
2 SHEETS—SHEET 2.

Witnesses:
Leonard W. Novander.
John A. Kinne

Inventor
Ernest E. Cole
By Brown, Hanson & Boettcher
Att'ys

UNITED STATES PATENT OFFICE.

ERNEST E. COLE, OF CHICAGO, ILLINOIS.

PNEUMATIC TIRE.

1,239,886.  Specification of Letters Patent.  Patented Sept. 11, 1917.

Application filed May 25, 1914. Serial No. 840,654.

*To all whom it may concern:*

Be it known that I, ERNEST E. COLE, a citizen of the United States, residing at Chicago, in the county of Cook and State of Illinois, have invented a certain new and useful Improvement in Pneumatic Tires, of which the following is a full, clear, concise, and exact description, reference being had to the accompanying drawings, forming a part of this specification.

My invention relates to pneumatic tires.

The success of the modern high speed automobile has been greatly dependent upon the pneumatic tire which has been the ultimate means for absorbing the minor inequalities of the road.

The pneumatic tire as it exists today is difficult of repair, expensive in upkeep and subject to the inherent defect of being totally incapacitated upon the development of any defect on the part of the structure. A tire with one bad spot is of no value whatsoever, although the remainder may be in practically perfect condition. As a consequence, a minor defect will ruin an otherwise sound tire, and if repairs are to be made it is necessary to remove the complete tire.

With the above inherent defects in view, the present invention has been conceived to correct the same.

One of the objects of the invention is to provide a structure which will successfully localize defects in a tire to only a small portion of the structure of the tire affected.

Another object is to provide improved means to increase the life of the pneumatic tire by allowing substitution or replacement of a defective part.

A still further object is to provide an improved sectional tire.

Another object is to provide an improved air valve for a pneumatic tire.

In the drawings—

Figure 1 is a view partly in section showing the arrangement of the sections on a wheel rim;

Fig. 2 shows a wheel supplied with a tire constructed in accordance with my invention;

Fig. 3 is a cross section of one form of the tire;

Fig. 4 is a cross section of a modification showing the manner in which the tire section is mounted on the wheel rim;

Figure 5:
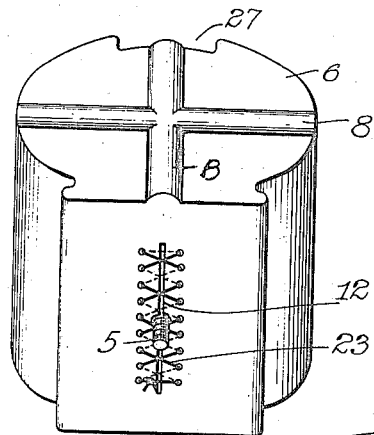
Fig. 5 is a perspective view of a section showing one form of fastening means for the edges of the casing.

The tire, in its complete form, as shown in Fig. 2, consists essentially of a number of sections 1, each of which is clamped to the rim 2 of a wheel 3, in this case shown as a familiar artillery type of automobile wheel. The sections may be protected by a shoe 4 forming both a wearing surface and a securing means for the sections. Each of the tire sections 1 is provided with an air connection 5, preferably including a valve. These valves may be arranged to retain only a certain predetermined pressure so that the inflation of the sections will be equal.

As shown in Fig. 1, the end walls of the sections are diagonally disposed with respect to the cross section of the tire. This is to secure a gradual transition from one section to the other as the wheel is revolved to prevent the load or pressure from being thrown suddenly upon any one of the sections. Furthermore, by disposition of the end walls 6 at an angle, it is possible to secure easier riding in view of the fact that these end walls 6 will be unable to offer any great resistance to flexing but might offer considerable resistance to crushing which would be the effect produced if the end walls were radially disposed.

Figure 6:
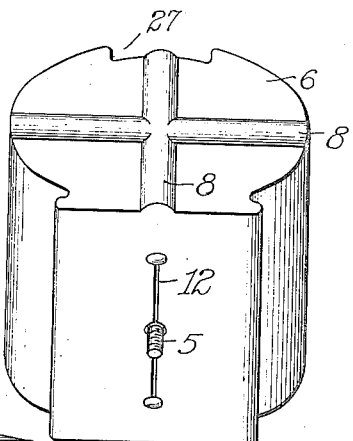
Fig. 6 is a view of a section corresponding to Fig. 4.

These end walls 6 are preferably provided with tongues 8 and grooves 9 coöperating when the sections are in place on the rim to prevent relative lateral displacement of the sections which might occur when turning corners, and the like, where a large side strain is imposed on the part of the tire which is in contact with the surface of the road bed. The means for preventing this relative lateral displacement may assume various forms. I have shown merely a rounded tongue fitting into a corresponding groove. As shown in Figs. 5 and 6 the tongues and grooves may be disposed in the form of a cross to guard against displacement in any direction in the plane of the end wall.

An inflatable inner tube 10 is placed inside of each of the sections to hold the same in distended position. This tube may be inflated by means of the valve 5. The tube 10 is inserted in the section through a slot 12 in the base of the section. This slot may be held in closed position by any suitable means. A canvas or other protecting strip 11 may be attached to the bottom of the section 10 to prevent the tube 10 being pinched in the slot 12 when the section is clamped upon the rim.

Figure 8:
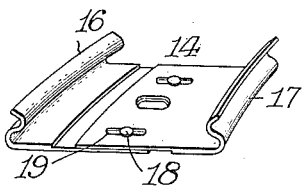
Fig. 8 shows a modification of the reinforcing means for the base of the tire.

In Fig. 4 I have shown a metallic plate 13 disposed on the inside of the tire adjacent the slot 12 and a metallic clip 14 on the outside of the tire attached to said inside plate 13 by means of bolts 15. This clip 14 may be made of a single part which is slipped over the base of the section by an end-wise motion or as shown in Fig. 8 it may be made in coöperating sections 16 and 17 adapted to have a limited amount of play by means of the pins 18 and slots 19 so that the clip may be readily placed upon the tire and be forced together by the action of the clamping rings 20 on the wheel rim when the section is put in place.

Figure 9:
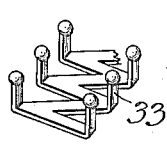
Fig. 9 is a perspective view of a form of metallic lacing which may be employed in connection with the section shown in Fig. 5.

The metallic plate 13 is preferably covered on both sides by strips of canvas 21, or the like, to prevent contact with the metal with the tube 10 or with the casing 7. The air valve 5 may be made in a form shown in Fig. 10 which will allow disconnection as by unscrewing so that the clip 14 may be readily placed in position. Instead of using a metallic clip and plate construction, I may employ merely a lacing 23 of any preferred form coöperating with holes in the edges of the slip 12 to hold said edges together so that the tire may be placed in position on the rim. I may employ the form of metallic lacing 33 shown in Fig. 9 as no great strain is imposed upon this lacing, it being intended to hold the edges of the slot 12 closed only while a section is being removed or replaced. When the sections are gripped by the rim of the wheel the strain is entirely removed from the lacing. Instead of employing the lacing shown in Fig. 5, I may employ a reinforcing plate 24 embedded in the base of the tire adjacent the edges of the slip 12. This plate 24 is preferably slotted at 25 to conform to the slit 12 in the casing. It can be seen that the plate 24 will offer a very considerable resistance to displacement of the base of the tire in the plane of the plate but that the plate may readily be bent, that is, one side of the plate 24 may be bent in and the other bent out to present a fairly large opening for inserting the tube 10 or for allowing inspection of the inside of the casing 7.

Figure 7:
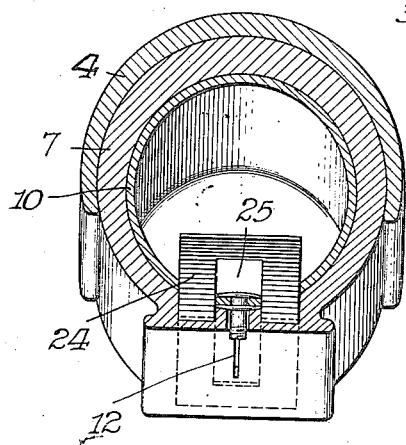
Fig. 7 is a view partly in section showing one form of reinforcing means for the tire.

The shoe 4 may be constructed as shown in Fig. 7 of merely a plain casing semicircular in cross section and adapted to fit over all the sections to retain them in close union. I prefer, however, to employ a reinforcing strip 26 of great tensile strength for preventing any expansion in the circumference of the shoe 4.

In the form shown in Fig. 3 this reinforcing strip 26 is placed on the inside of the shoe 4 and fits into a groove 27 formed in the top of each one of the sections. By this groove and strip relative sidewise displacement of the section is prevented as reinforcing strip 26 forms a lock with each of the sections. To further increase the rigidity of the tire structure, reinforcing wires 30 formed in the edges of the shoe 4 may be let into grooves 31 at the side of the tire. Either or both of these means may be employed to strengthen the tire structure.

Figure 10:
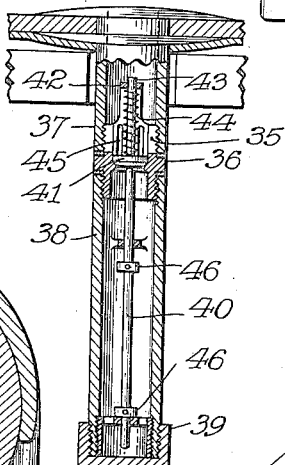
Fig. 10 is a sectional elevation of an improved form of valve.

As shown in Fig. 4, the reinforcing strip 26 which may be of leather or the like, is used also as a wearing face for the casing 7. The strip 26 may be further protected by the well-known studs 32. The valve shown in Fig. 10 is provided to facilitate placing of the tire sections upon the rim by decreasing the length of stem while the tire is being put in place. The valve mechanism 35 is mounted in a nipple 36 between the ends of the main stem 37 and the extension 38 and is joined to them, preferably by screw threads. The extension 38, which may carry a cap 39 of any preferred form, may be connected to the nipple 36 after the tire has been put in place. The extension 38 carries a rod 40 through which the valve 41 may be suitably controlled. The nipple 36 carries a bridge piece 42 through which the stem 43 of the valve extends and which forms a guide for this stem. The valve 41 when closed is pressed against a seat in the nipple 36 by a compression spring 44 to retain the air in the tire.

Slots 45 are provided on the inner bore of the nipple in which the valve 41 has its bearing in order to allow the escape of the air around said valve when the valve is off of its seat. Stops 46 may limit the movement of the rod 40 in the extension 38.

In applying the above described tire to a wheel, it is desirable to employ the usual fastening means, that is, the common form of rim and clencher mechanism to grip the base of the tire to secure the same firmly on the rim of the wheel.

It can be seen that I have provided a structure which will minimize tire troubles, and which will secure all of the advantages of the well known form of pneumatic tire. If a section becomes damaged it may be replaced by another section by merely loosening the fastening rings or rings 20, withdrawing the damaged section and inserting an uninflated section in the place thereof.

The walls of the sections are made of such strength that they resist any considerable endwise displacement and as soon as the inserted section is inflated the tire will be ready for use.

It can be seen that not only is it necessary to repair and replace only the one section, but it is necessary to inflate only the one section, thus avoiding the necessity of pumping up the whole tire. Removal and insertion of sections may be made without disturbing the shoe 4 as the section, when deflated, may be pressed downward and sidewise.

If desired, inflated sections may be carried on the car and when it is desired to replace a section it is necessary merely to release the clencher rim mechanism and to withdraw the defective section. At the same time the ends of the adjacent sections are pressed outward and downward to free them from the shoe 4. The inflated section is then wedged between these sections and the new section together with the ends of the adjacent section is forced back under the shoe 4 upon the rim. This is possible because of the joined valve stem which may be connected after the tire has been put in place. The clencher rings may then be applied in the usual manner and the operation is complete.

Although the invention has been described with reference to the details of a particular modification, it is not intended thereby to limit the invention as the same may be subject to numerous modifications which will be apparent to those skilled in the art and which I consider to come within the scope and spirit of my invention. The various proportions that I have shown are largely diagrammatic and it is not intended that the invention should be limited to the various forms or proportions.

What I claim as new and desire to secure by Letters Patent of the United States is:

1. In a sectional pneumatic tire, an inflatable tire casing having an opening in the base, an inflatable tube within said casing, means for closing said opening, said means comprising a plate disposed within said casing and an adjustable clip disposed without said casing and engaging the same and means to secure said plate and said clip together.

2. In a sectional pneumatic tire, a main casing having an opening therein, an inflatable tube receivable in first said casing, a plate within the main casing between the inner periphery thereof and said inflatable tube, an adjustable clamping member to engage exteriorly said main casing, and means engaging said inner plate and clamping member to maintain both of the same in engagement with said casing.

In witness whereof, I hereunto subscribe my name this 22nd day of May, A. D. 1914.

ERNEST E. COLE.

Witnesses:
LEONARD W. NOVANDER,
JOHN H. DIENNE.